United States Patent [19]

Okabe

[11] Patent Number: 4,657,524

[45] Date of Patent: Apr. 14, 1987

[54] SELF-CONTAINED TENSIONING DEVICE FOR A BELT OR SIMILAR STRUCTURE

[75] Inventor: Yoshio Okabe, Chiryu, Japan

[73] Assignee: Aisin Seiki Kabushiki Kaisha, Kariya, Japan

[21] Appl. No.: 756,648

[22] Filed: Jul. 19, 1985

[30] Foreign Application Priority Data

Jul. 25, 1984 [JP] Japan .................. 59-113639[U]

[51] Int. Cl.⁴ ............................................. F16H 7/08
[52] U.S. Cl. ................................. 474/110; 474/133; 474/101
[58] Field of Search ............... 474/101, 104, 109, 133, 474/135, 110; 74/501.5 R, 526

[56] References Cited

FOREIGN PATENT DOCUMENTS 758098 1/1934 France ...................... 474/104
288544 6/1929 United Kingdom ........ 474/104

Primary Examiner—James A. Leppink
Assistant Examiner—Frank H. McKenzie, Jr.
Attorney, Agent, or Firm—Oblon, Fisher, Spivak, McClelland & Maier

[57] ABSTRACT

A self-contained tensioning device for a belt or similar structure and which includes a plunger slidably mounted in a body member, a free piston slidably mounted in the plunger and having a head portion extending from a shoulder of the body member and which contacts with an idler pulley so as to apply a tensioning face to the belt, a projection provided on the shoulder and projecting axially so as to minimize the distance between a portion of the idler pulley contacting the head portion and the shoulder of the body member.

3 Claims, 1 Drawing Figure

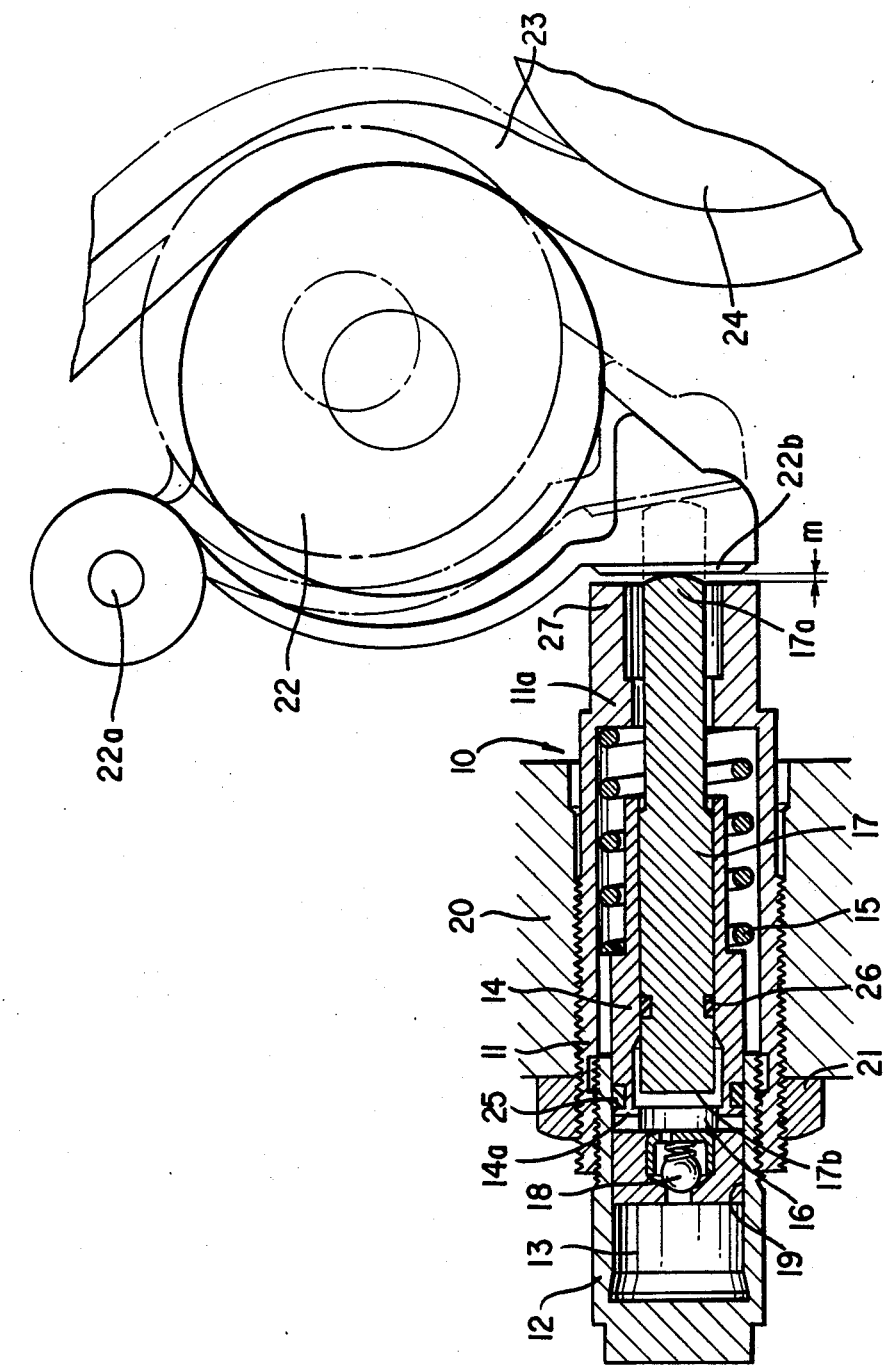

SELF-CONTAINED TENSIONING DEVICE FOR A BELT OR SIMILAR STRUCTURE

BACKGROUND OF THE INVENTION

1. Field of the Invention

This invention relates generally to tensioning devices and, more particularly, to a tensioning device or autotensioner of the self-contained type in which fluid is sealed within the assembly with no provision for its replacement from any external source during operation for a tensioned belt, chain or the like.

2. Discussion of the Background

In conventional self-contained tensioning devices, such as shown in Japanese Utility Model Laid-Open Application No. 57(1982)-155350, the operating fluid is sealed within the assembly and is prevented from flowing out toward the exterior by a sealing member. However, when the operating fluid flows out due to damage of the sealing member, the self-contained tensioning device cannot maintain a pressing force for tensioning the belt or similar structure and, as a result, the belt is allowed to sag.

SUMMARY OF THE INVENTION

It is therefore an object of the present invention to avoid the disadvantages of the prior art self-contained tensioning device for a belt or similar structure.

More particularly, it is an object of the present invention to provide an improved self-contained tensioning device for a belt or similar structure wherein the amount of sag of the belt is held in check so as to be minimized.

It is another object of the present invention to provide an improved self-contained tensioning device which is simple in construction and is inexpensive in overall cost.

These and other objects are achieved or facilitated in accordance with the present invention by providing a new and improved self-contained tensioning device which includes a body member, a plunger slidably mounted in the body member, a free piston slidably mounted in the plunger and projected from a shoulder of the body member and having a head portion contacted with an idler pulley giving proper tension to a timing belt, and a projection formed on the shoulder of the body member and extending in axial direction so as to decrease the distance between the shoulder of the body member and a portion of the idler pulley contacted with the head portion of the free piston to be as short as possible Accordingly, even when the operating fluid within the assembly flows out to the exterior, whereby the self-contained tensioning device loses the pressing force for tensioning the timing belt and the free piston is retracted within the plunger, that portion of idler pulley contacted with the head portion abuts the projection formed on the shoulder of the body member. As the result, the returning stroke of the idler pulley is held in check so as to be minimized whereby the amount of sag of the timing belt is also minimized.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

The sole FIGURE is a cross-sectional view of a self-contained tensioning device according to a preferred embodiment of the present invention.

DESCRIPTION OF THE PREFERRED EMBODIMENT

As shown in the sole FIGURE, a self-contained tensioning device 10 comprises an outer body 11 screwed into an outer wall 20 of an engine (not shown) and tightened by nut 21, an inner body 12 screwed and fixed so as to be partially located within the outer body 11 and a plunger 14 slidably mounted in the inner body 12 so as to form a large diameter fluid chamber 13 within the inner body 12.

The plunger 14 is constantly biased in the direction of the large diameter fluid chamber 13 by a spring 15. A free piston 17 is slidably mounted in the plunger 14 so as to form a small diameter fluid chamber 16 in the plunger 14. The large diameter fluid chamber 13 communicates with the small diameter fluid chamber 16 via a one-way check valve 18 permitting fluid flow only from the large diameter fluid chamber 13 to the small diameter fluid chamber 16. The fluid pressure in the small diameter fluid chamber 16 is relieved to the large diameter fluid chamber 13 via a leakage clearance or bypass clearance 19 provided between the inner body 12 and the plunger 14.

A head portion 17a of the free piston 17 projects from a shoulder 11a of the outer body 11 and contacts with a portion 22b of idler pulley 22 rotatably mounted on a pulley holder (not shown) whereby the idler pulley 22 is continuously pressed in the direction of sagging of a timing belt 23, therefore providing proper tensioning of timing belt 23. Reference numeral 24 indicates a crank pulley.

The fluid sealed within the tensioning device 10 is prevented from flowing out to the exterior by a first sealing member 25 provided between the plunger 14 and the inner body 12 and a second sealing member 26 provided between the plunger 14 and the free piston 17.

When sagging of the timing belt 23 is caused, the free piston 17 is shifted to the right in the FIGURE and presses the portion 22b of the idler pulley 22 as shown in a two-dotted chain line whereby the idler pulley 22 rotates in a counterclockwise direction around a fulcrum 22a of the idler pulley 22, sagging of the timing belt 23 is overcome and proper tensioning of the timing belt is provided.

An axially extending projection 27 is unitarily formed with the shoulder 11a of the outer body 11, whereby the distance M between the contacting portion 22b as well as the head portion 17a of the free piston 17 and the edge of the projection 27 is set so as to be as short as possible.

When the pressing power of the tensioning device applying a tensioning force to the timing belt 23 is discontinued due to damage occurring to either first sealing member 25 or second sealing member 216 such that the fluid sealed within the tensioning device 10 flows out to the exterior, the free piston 17 moves leftwardly and the idler pulley 22 rotates in a clockwise direction around the fulcrum 22a in response to movement of the free piston 17. However, movement of the idler pulley 22 is limited by the projection 27 acting as a stopper for the idle pulley 22. Therefore, the amount of return movement of the contacting portion 22b of the idler pulley 22 can be set within a preselected range by selecting the axial length of the projection 27 so that the amount of sagging of the timing belt 23 is minimized when the pressing force for tensioning the timing belt 23 is discontinued.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A self-contained tensioning device for a belt or similar structure which contacts a movable idler pulley, comprising:
    a body member having a shoulder portion;
    a plunger slidably mounted in said body member;
    a free piston slidably mounted in said plunger and having a head portion extended from said shoulder portion of said body member and contacted with said idler pulley so as to apply a tensioning force to said belt;
    a projection provided on said shoulder portion of said body member and projecting axially so as to minimize a distance between a portion of said idler pulley contacting said head portion and said shoulder wherein said plunger is slidably mounted in said body member so as to form a large diameter fluid chamber within said body member and said free piston is slidably mounted in said plunger so as to form a small diameter fluid chamber in said plunger;
    a spring for biasing said plunger in the direction of said large diameter fluid chamber; and
    a one-way check valve for permitting fluid flow only from said large diameter fluid chamber to said small diameter fluid chamber and wherein said projection comprises stopper means for limiting movement of said movable idler pulley.

2. A self-contained tensioning device according to claim 1, wherein said projection is unitarily formed with said shoulder portion of said body member.

3. A self-contained tensioning device according to claim 1, further comprising means for fixing said body member to an outer wall of an engine.

* * * * *